United States Patent [19]

Wilkes

[11] Patent Number: 4,539,498
[45] Date of Patent: Sep. 3, 1985

[54] SUPPORT SYSTEM FOR A SUBMERSIBLE D.C. MOTOR

[75] Inventor: Robert D. Wilkes, Little Rock, Ark.

[73] Assignee: Jacuzzi Inc., Little Rock, Ark.

[21] Appl. No.: 418,789

[22] Filed: Sep. 16, 1982

[51] Int. Cl.³ .............................................. H02K 5/10
[52] U.S. Cl. ................................ 310/87; 310/219; 310/104; 310/58
[58] Field of Search ............... 310/87, 104, 228, 248, 310/253, 219, 55, 56

[56] References Cited

U.S. PATENT DOCUMENTS

| | | | |
|---|---|---|---|
| 860,791 | 7/1907 | Ells . | |
| 1,269,909 | 6/1918 | Cooper . | |
| 1,722,632 | 7/1929 | Johnson | 310/55 |
| 1,941,335 | 12/1983 | Averrett . | |
| 1,989,104 | 1/1935 | Mendenhall et al. . | |
| 2,107,481 | 2/1938 | Johnson | 310/87 X |
| 2,492,141 | 12/1949 | Gaylord . | |
| 2,656,475 | 10/1953 | Diehl et al. . | |
| 2,674,194 | 4/1954 | Arutunoff . | |
| 2,703,372 | 3/1955 | Savage | 310/228 |
| 2,739,255 | 3/1956 | Shobert et al. . | |
| 2,744,206 | 5/1956 | Hansen | 310/228 |
| 2,758,226 | 8/1956 | Fisher . | |
| 2,786,952 | 3/1957 | Pleuger | 310/87 |
| 2,870,353 | 1/1959 | Shobert . | |
| 3,405,295 | 10/1968 | Daley et al. | 310/104 |
| 3,671,786 | 6/1972 | Jones . | |
| 3,826,938 | 7/1974 | Filer | 310/104 |
| 3,841,906 | 10/1974 | Grunewald et al. . | |
| 4,207,485 | 6/1980 | Silver | 310/104 |
| 4,241,271 | 12/1980 | Johnson et al. | 310/248 X |

Primary Examiner—Donovan F. Duggan
Attorney, Agent, or Firm—Hill, Van Santen, Steadman & Simpson

[57] ABSTRACT

A submersible electric D.C. motor is provided which has a housing that seals the motor from the surrounding water and holds in a controlled atmosphere which is made to be low in oxygen content and to have free water vapor. Magnetic means are provided to transmit mechanical energy through the housing and liquid means are provided to remove heat from the motor.

11 Claims, 1 Drawing Figure

U.S. Patent    Sep. 3, 1985    4,539,498
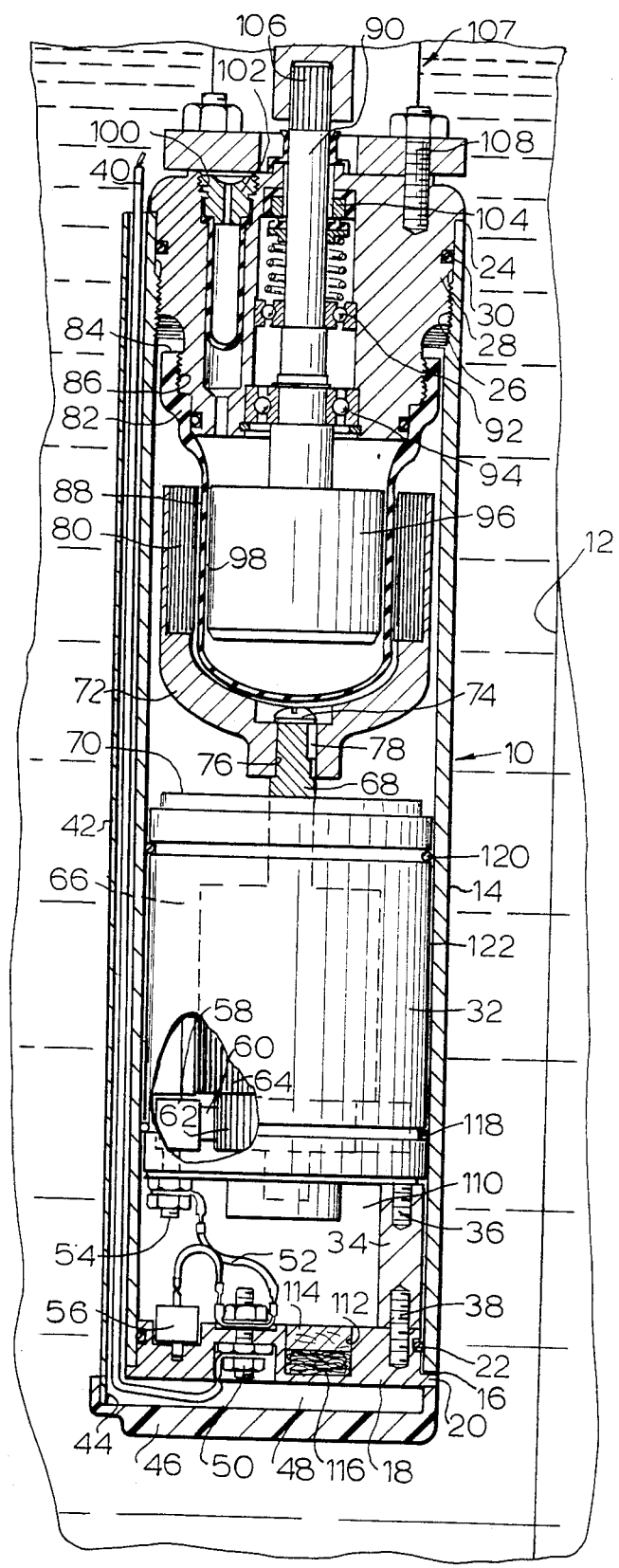

SUPPORT SYSTEM FOR A SUBMERSIBLE D.C. MOTOR

BACKGROUND OF THE INVENTION

1. Field of the Invention

The present invention relates to submersible D.C. electric motors and more particularly to a support system for enhancing the long term life of a brush-type submersible D.C. electric motor.

2. Description of the Prior Art

There are several problems involved with providing a suitable environment to support the long term life of a brush-type D.C. electric motor which is to operate totally submerged in water. These problems which are not completely and satisfactorily addressed by the prior art are:

(1) Long term integrity against water leakage into the motor working parts when the motor is submerged hundreds of feet under water, while transmitting through the enclosure mechanical energy, for example to a pump.

(2) Provision for good brush life with carbon brushes which require free water vapor in the surrounding atmosphere.

(3) Provision for lowering of the oxygen content of the entrapped air surrounding the motor to prevent commutator oxidation which causes brush resistance increases and subsequent higher wear rates.

(4) Provision for the simple execution of a means to overcome the above problems with a technique readily available in field maintenance conditions, for example, no filling of the motor enclosure with pressurized inert gases required, etc.

SUMMARY OF THE INVENTION

The device of the present invention makes use of a magnetic coupling to transfer mechanical energy across an impermeable barrier as the basic isolation technique whereby a D.C. electric motor can be sealed with static seals and exhibit no wear-out mechanism. Any gas within such an enclosure will be trapped and retained to a high quality level that can be arbitrarily high. The leak integrity can be totally hermetic using fusion joining techniques throughout or gasketed with leakage rates that are not of practical concern. It is important however to provide for water vapor in the enclosed atmosphere as the brush wear-out process over time or other absorptive processes could deplete the initial water vapor content. Additionally, it is important to minimize the free oxygen in the enclosed atmosphere to prevent commutator oxidation.

The device disclosed in the present application utilizes a liquid water retention member, such as a porous solid, and an active material to consume free oxygen, such as steel wool. A quantity of water held by capillary attraction in a porous material will outgas and emit water vapor to a partial pressure commensurate with the temperature of the water according to the laws of thermodynamics. If water vapor is consumed by any process within the enclosure, such as brush wear or absorption into a solid, this will lower the partial pressure of the water vapor and trigger the evaporation of liquid water to replenish the loss. Once the partial pressure and temperature are stabilized, no more water will evaporate.

Using this water vapor replenishment technique in combination with a material that readily oxidizes, such as steel wool, provides a very simple technique to control the long term gaseous environment in a sealed motor enclosure. The steel wool readily forms iron oxide which chemically binds the free oxygen in the entrapped air, driving the resulting gaseous environment to be predominantly nitrogen and water vapor. Other chemical compounds could be used in the place of steel wool to chemically bind the free oxygen and thus protect the commutator.

As brushes wear out over years of use and need replacement, the motor cavity can be opened and the brushes serviced. At the same time, the water bearing pads can be resaturated with ordinary water and a steel wool reservoir renewed with fresh material. With only air used as the surrounding atmosphere, the motor, once resealed, will quickly adapt to a stabilized condition as described above. These conditions are the most favorable to long brush life known at this time.

Since provision for on-site maintenance and low manufacturing cost are the main objectives for this design approach, easy motor removal is mandatory. However, motor cooling is also an important issue. The design for both excellent heat transfer of the motor heat to the enclosure wall which is cooled by water flow over the outside, and easy removability is accomplished by a liquid film and a sliding motor fit. The motor is provided with O-rings on each end to trap a thin film of fluid which conducts motor heat to the enclosure wall. This fluid can be most any substance and mineral oil has been used successfully as it also lubricates the parts for easy insertion and removal. Thus, it is seen that the present invention provides a system approach to D.C. motor support and maintenance that is geared to simplicity and reliability for relatively primitive and easy field service. It also has the benefit of low cost initial manufacture.

DESCRIPTION OF THE DRAWING

The FIGURE is a side sectional view partially cut away of a D.C. motor submerged under water.

DESCRIPTION OF THE PREFERRED EMBODIMENTS

In the FIGURE there is shown an electric motor generally at 10 which is schematically shown to be submerged under water within a casing 12 of a well. The motor 10 comprises a cylindrical outer shell 14 which is held in place at a bottom end 16 by a bottom plate 18 having a peripheral flange 20. The flange 20 provides a surface for capturing and holding the bottom end 16 of the shell 14. An O-ring 22 mounted between the bottom plate 18 and the shell 14 provides a waterproof seal between the interior and exterior of the shell 14 at the bottom end.

Near the top end 24 of the shell 14 the shell is internally threaded as at 26 to make with an externally threaded end bell 28. A second O-ring 30 between the end bell 28 and shell 14 provides a waterproof seal between the exterior and interior of the shell 14 at the top end 24 of the shell.

Carried within the shell there is mounted a D.C. electric motor 32 supported on a plurality of legs 34 which are securely fastened to the end plate 18 by appropriate fastening means such as screws 36 and 38.

Electrical energy is supplied to the D.C. motor 32 through a motor cable 40 which extends through the entire depth of the well or other placement of the electric motor and is encased and protected by a cable shield 42. The cable shield 42 is secured at a bottom end 44 in an end plate 46 which is secured to the bottom plate 18 in a water tight manner such as with a silicone sealant provided in the cavity shown at 48.

The motor lead cable 40 is connected to an electrical feed through 50 which is provided with sufficient seals to prevent water leakage through the end plate 18. A jumper wire 52 is provided to connect an input terminal 54 of the electrical motor with the electrical feed through 50 and a lightning arrestor 56 is also provided which is connected to the electrical feed through to prevent electrical damage to the motor 32.

As seen in the cut away portion of the electric motor 32, the input terminal 54 is connected to a brush holder 58 which holds carbon brushes 60. The carbon brushes contact commutator segments 62 in the normal manner to provide electrical energy to the motor during the rotation of armature 64 within the field pole and windings 66. Extending through the armature 64 and secured thereto is a shaft 68 which extends beyond a top end 70 of the motor and is received in and secured to a drive cup 72 by appropriate fastening means such as a screw 74. The drive cup 72 has an opening 76 through which the shaft 68 extends and a key 78 is provided to ensure corotation of the drive cup 72 with the shaft 68. A magnet 80 is mounted in the drive cup 72 so as to rotate therewith.

A molded cup 82 has an open top end 84 which is internally threaded as at 86 to attach to a correspondingly threaded portion of the end bell 28 to secure the cup 82 in position. The cup 82 is shaped to extend into the drive cup 72 in close proximity to the interior walls of the drive cup 72 and the magnet 80 such that there is sufficient clearance at 88 between the molded cup 82 and the drive cup 72 and magnet 80 to prevent contact during rotation of the drive cup and magnet.

A second shaft 90 extends through the end bell 28 and is mounted on bearings 92 and 94 to allow rotation of the shaft 90 within the end bell 28. Mounted on a bottom end of the shaft 90 is a second magnet 96 having a cylindrical shape which is sized to fit within the molded cup 82 and having an outer circumference slightly less than the inner circumference of the molded cup 82 to provide a minimum clearance at 98 between the magnet 96 and the molded cup 82 to prevent contact therebetween during rotation of the magnet 96. A lubricant such as mineral oil may be placed in the cavity inside the molded cup 82 through an opening 100 in the end bell 28 which is sealed with a vented valve 102. The lubricant will lubricate the bearings 92 and 94 and a seal 104 will prevent leakage of the lubricant along the shaft as it exits the end bell 28.

The shaft 90 has a splined end 106 to provide rotating drive force to another mechanism such as a pump 107 which can be secured to the end bell 28 by appropriate fastening means such as stud 108.

In operation, as the electric motor is rotated, the first magnet 80 carried in the drive cup 72 causes rotation of the second magnet 96 carried on shaft 90 which in turn causes shaft 90 to rotate. Therefore the mechanical energy generated by the electric motor 32 is transferred to that second shaft 90 across the impermeable barrier of the molded cup 82.

To enhance long term life of the carbon brushes 60 of the electric motor, it is necessary to provide an atmosphere having free water vapor.

Within the shell 14 and above the bottom plate 18 and below the electric motor 32 there is a cavity 110 which can be filled with atmosphere. After the shell is attached to the end bell 28 and bottom plate 16, the cavity 110 will be sealed from external communication. The brushes 60, however, are in communication with the cavity 110 in that the atmosphere in cavity 110 is also in contact with brushes 60. To ensure long life for the carbon brushes 60 it is this atmosphere which must contain free water vapor. Also, to prevent oxidation of the commutator it is also desirable to remove free oxygen from the atmosphere in cavity 110. In order to accomplish both of these goals, there is provided a well 112 in the bottom plate 18 which communicates with the cavity 110. In this well there can be placed a liquid retention member 114 which could be a porous solid such as felt. Also within the well 112 can be placed an active material 116 to consume free oxygen, such as steel wool.

A quanity of water held by capillary attraction in the porous material 114, such as felt, will outgas and emit water vapor to a partial pressure commensurate with the temperature of the water according to the laws of thermodynamics. If water vapor is consumed by any process within the enclosure, such as brush wear or absorption into a solid, this will lower the partial pressure of the water vapor and trigger the evaporation of liquid water to replenish the loss. Once the partial pressure and temperature are stabilized, no more water can evaporate. Thus, in the sealed chamber 110 there will remain a supply of free water vapor in the enclosed atmosphere.

The active material 116 which consumes free oxygen, such as steel wool, will readily form an oxide of the material such as iron oxide which will chemically bind the free oxygen in the entrapped atmosphere driving the resulting gaseous environment to be predominantly nitrogen and water vapor. Chemical compounds other than steel wood could also be used to chemically bind the free oxygen and thus protect the commutator. The choice of steel wood and felt permits a very simple and yet reliable method of controlling the motor environment.

As the brushes 60 wear out over the years of use and need replacement, the motor cavity can be opened and the brushes serviced. At the same time, the water retention member 114 can be resaturated with ordinary water and the active material 116 can be renewed with fresh material. With only air used as a surrounding atmosphere, the motor, once resealed, will quickly adapt to a stabilized condition as described above.

The present invention is concerned not only with long life of the brushes but also for ease of on-site maintenance and low manufacturing cost. In this regard, easy motor removability is mandatory. Also, motor cooling is an important issue. The present device provides for both excellent heat transfer of the motor heat to the outer shell 14 which is cooled by water flow over the outside, and easy removal is accomplished by a liquid film and a sliding motor fit. The motor 32 is provided with O-rings 118 and 120 on each end to trap a thin film of fluid between the motor 32 and the shell 14 as at 122 which conducts motor heat to the outer shell. This fluid can be most any substance and mineral oil has been used successfully as it also lubricates the parts for easy insertion and removal.

As is apparent from the foregoing specification, the invention is susceptible of being embodied with the various alterations and modifications which may differ particularly from these that have been described in the preceding specification and description. It should be understood that I wish to embody within the scope of the patent warranted hereon all such modifications as reasonably and properly come within the scope of my contribution to the art.

I claim as my invention:

1. A submersible electric D.C. motor comprising:
a sealable housing including an end plate,
an electric D.C. motor mounted to said end plate within said housing having an extending rotatable shaft,
a second rotatable shaft,
an impermeable barrier between said first and second shafts,
means for transmitting mechanical energy from said first shaft to said second shaft across said barrier,
a well formed in said end plate interior of said housing,
a water retention member insertable in said well and being in communication with the atmosphere within said sealed housing, and
an active material which chemically binds oxygen insertable in said well with said water retention member and also being in communication with the atmosphere within said sealed housing;
whereby said atmosphere within said housing is converted from ambient air to an atmosphere which has free water vapor and low oxygen content after said housing is sealed.

2. The device of claim 1 wherein said means for transmitting mechanical energy across said barrier comprises magnetic means.

3. The device of claim 1 wherein said liquid retention member is a porous solid.

4. The device of claim 1 including means for removing heat from said motor through said housing.

5. The device of claim 1 wherein said means for removing heat from said motor comprises means providing a film of liquid between said motor and said housing whereby heat is transferred through said liquid.

6. A submersible electric D.C. motor comprising:
a sealable housing including an end plate,
an electric D.C. motor mounted to said end plate within said housing,
a well formed in said end plate interior of said housing,
a water retention member insertable in said well and being in communication with the atmosphere within said sealed housing, and
an active material which chemically binds oxygen insertable in said well with said water retention member and also being in communication with the atmosphere within said sealed housing;
whereby said atmosphere within said housing is converted from ambient air to an atmosphere which has free water vapor and low oxygen content.

7. The device of claim 6 wherein said liquid retention member is a porous solid.

8. The device of claim 6 including means for removing heat from said motor through said housing.

9. The device of claim 16 wherein said means for removing heat from said motor comprises providing a film of liquid between said motor and said housing whereby heat is transferred through said liquid.

10. A submersible electrical D.C. motor comprising:
an electrical D.C. motor,
a housing including an end plate comprising an impermeable barrier around said motor and forming a cavity in which said motor is secured,
liquid means between said motor and said housing to enhance cooling of said motor,
magnetic means for transmitting mechanical energy generated by said motor through said housing barrier,
a well formed in said end plate interior of said housing,
a water retention member insertable in said well and being in communication with the atmosphere within said sealed housing, and
an active material which chemically binds oxygen insertable in said well with said water retention member and also being in communication with the atmosphere within said sealed housing;
whereby said atmosphere within said housing is converted from ambient air to an atmosphere which has free water vapor and low oxygen content.

11. A submersible electrical D.C. motor comprising:
an electrical D.C. motor,
a housing comprising an impermeable barrier around said motor and forming a cavity in which said motor is secured,
liquid means between said motor and said housing to enhance cooling of said motor,
magnetic means for transmitting mechanical energy generated by said motor through said housing barrier,
a receptacle within said cavity inaccessable from outside said cavity,
a water retention member held in said receptacle and being exposed to the atmosphere within said cavity, and
an active material which chemically binds oxygen held in said receptacle and being exposed to the atmosphere within said cavity;
whereby said atmosphere within said housing is converted from ambient air to an atmosphere which has free water vapor and low oxygen content after said housing is sealed.

* * * * *